(12) United States Patent
van den Berg et al.

(10) Patent No.: US 7,117,815 B2
(45) Date of Patent: Oct. 10, 2006

(54) DEVICE FOR MILKING ANIMALS

(75) Inventors: Karel van den Berg, Bleskensgraaf (NL); Renatus Ignatus Josephus Fransen, Vlaardingen (NL)

(73) Assignee: Lely Enterprises AG, Zug (CH)

( * ) Notice: Subject to any disclaimer, the term of this patent is extended or adjusted under 35 U.S.C. 154(b) by 0 days.

(21) Appl. No.: 10/249,981

(22) Filed: May 23, 2003

(65) Prior Publication Data

US 2003/0226511 A1    Dec. 11, 2003

(30) Foreign Application Priority Data

Jun. 6, 2002    (NL)  ................................ 1020785

(51) Int. Cl.
A01J 5/17    (2006.01)
(52) U.S. Cl. .................. 119/14.08; 119/14.02
(58) Field of Classification Search ............. 119/14.01, 119/14.02, 14.03, 14.08, 14.14, 14.15
See application file for complete search history.

(56) References Cited

U.S. PATENT DOCUMENTS

| | | | |
|---|---|---|---|
| 3,861,355 A * | 1/1975 | Johnson et al. ........... | 119/14.08 |
| 5,178,095 A * | 1/1993 | Mein ......................... | 119/14.47 |
| 5,218,924 A * | 6/1993 | Thompson et al. ....... | 119/14.02 |
| 5,284,180 A | 2/1994 | Guo et al. | |
| 5,769,025 A * | 6/1998 | van der Lely et al. ..... | 119/14.42 |
| 5,826,536 A * | 10/1998 | van der Lely et al. ..... | 119/14.02 |
| 5,865,138 A * | 2/1999 | van der Lely ............. | 119/14.02 |
| 5,957,081 A * | 9/1999 | van der Lely et al. .... | 119/14.09 |
| 5,960,736 A * | 10/1999 | Ludington et al. ........ | 119/14.08 |
| 6,009,832 A | 1/2000 | Innings et al. | |
| 6,050,219 A * | 4/2000 | van der Lely ............ | 119/14.08 |
| 6,079,359 A * | 6/2000 | van den Berg ........... | 119/14.01 |
| 6,213,051 B1 | 4/2001 | Fransen | |
| 6,494,163 B1 * | 12/2002 | Oort ........................... | 119/14.1 |
| 6,510,812 B1 * | 1/2003 | Petterson et al. ......... | 119/14.02 |
| 6,584,931 B1 * | 7/2003 | Kall et al. ................ | 119/14.02 |
| 2002/0034447 A1 | 3/2002 | Brazil et al. | |

FOREIGN PATENT DOCUMENTS

| | | | |
|---|---|---|---|
| DE | 11235508 B | | 2/1962 |
| EP | 0385539 | * | 9/1990 |
| EP | 0679331 A | | 11/1995 |
| EP | 1068796 A | | 1/2001 |
| FR | 2065129 A | | 7/1971 |
| GB | 2119217 | * | 11/1983 |
| WO | WO 99/35904 A | | 7/1999 |

OTHER PUBLICATIONS

Search report from the corresponding Dutch patent application.

* cited by examiner

Primary Examiner—Peter M. Poon
Assistant Examiner—David J. Parsley
(74) Attorney, Agent, or Firm—Basser Howrey LLP

(57) ABSTRACT

A device for milking animals is provided with at least two milking robots, each for automatically connecting at least one teat cup to a teat of an animal. Each milking robot is provided with a milking vacuum unit for generating a milking vacuum for milking an animal. The device is provided wit a common ring line and wit a controllable, central vacuum system for generating a vacuum with a first pressure on the common ring line. Each milking vacuum unit is connected to the ring line via a passage, a control device being provided for controlling the size of the passage.

19 Claims, 1 Drawing Sheet

DEVICE FOR MILKING ANIMALS

CROSS REFERENCE TO RELATED APPLICATIONS

This application claims priority from Dutch patent application no. 1020785 filed Jun. 6, 2002, the contents of which are hereby incorporated by reference in their entirety.

BACKGROUND OF INVENTION

1. Field of the Invention

The present invention relates to the field of milking and more particularly to a device for milking animals.

2. Description of the Related Art

Devices are known for automatically milking dairy animals in which a milking robot automatically connects at least one teat cup to a teat of an animal. In certain cases, a number of milking robots may be provided, each milking robot having its own milking vacuum unit for generating a milking vacuum for milking the animal.

SUMMARY OF INVENTION

The invention aims at providing an alternative device requiring less maintenance and consuming less energy.

For this purpose, according to the invention, a device for milking animals of the above-described type comprises at least two milking robots, each for automatically connecting at least one teat cup to a teat of an animal, each milking robot being provided with a milking vacuum unit for generating a milking vacuum for milking an animal. The device further comprises a common ring line and a controllable, central vacuum system for generating a vacuum with a first pressure on the common ring line, wherein each milking vacuum unit is connected to the ring line via a passage, a control element being provided for controlling the size of the passage. Due to the fact that, in known devices, for each milking robot an individual, fully controllable milking vacuum unit for generating a milking vacuum for-milking an animal is used, these known devices require more maintenance and consume considerable energy. Due to the fact that according to the invention a controllable, central vacuum system for generating a vacuum with a first pressure on the common ring line is provided, the maintenance and the energy consumption may be reduced.

The central vacuum system is preferably provided with at least one frequency-controlled vacuum pump.

In order to reduce pressure fluctuations, in an embodiment of a device according to the invention the central vacuum system may be provided with a common buffer vessel.

In order to keep the pressure in the ring line at a desired value, in an embodiment of a device according to one aspect of the invention it is advantageous if a pressure sensor is disposed in the common buffer vessel. Said pressure sensor may for example control the frequency-controlled vacuum pump.

In order to prevent undesired pressure fluctuations in a milking vacuum unit, in a preferred embodiment of a device according to the invention, an individual buffer vessel may be disposed between each of the control devices and the ring line. Each milking vacuum unit is preferably provided with a pressure sensor that may be used for controlling the control devices. The control devices may in particular be controlled by the pressure sensor in such a way that there is generated in the relevant milking vacuum unit a vacuum with a pressure higher than the first pressure. It is advantageous if the first pressure is between −55 kPa and −50 kPa and the second pressure is between −50 kPa and −40 kPa.

In an embodiment of a device according to a further aspect of the invention, the device may be provided with a milking process stage device for determining the stage of the milking process in a milking robot, and the controllable, central vacuum system may be controlled with the aid of data from the milking process stage device. Here it may be taken into account inter alia how many milking robots are milking, how many milking robots are connecting teat cups, how many milking robots are disconnecting teat cups, and how many milking robots are non-active.

In a further embodiment of a device according to another aspect of the invention, the device may be provided with control valves, and with a valve position device for determining the position of the control valves, and the controllable, central vacuum system may be controlled with the aid of data from the valve position device.

BRIEF DESCRIPTION OF DRAWINGS

An embodiment of the invention will now be explained in further detail by way of example only with reference to the accompanying figure, in which.

DETAILED DESCRIPTION

Figure 1:
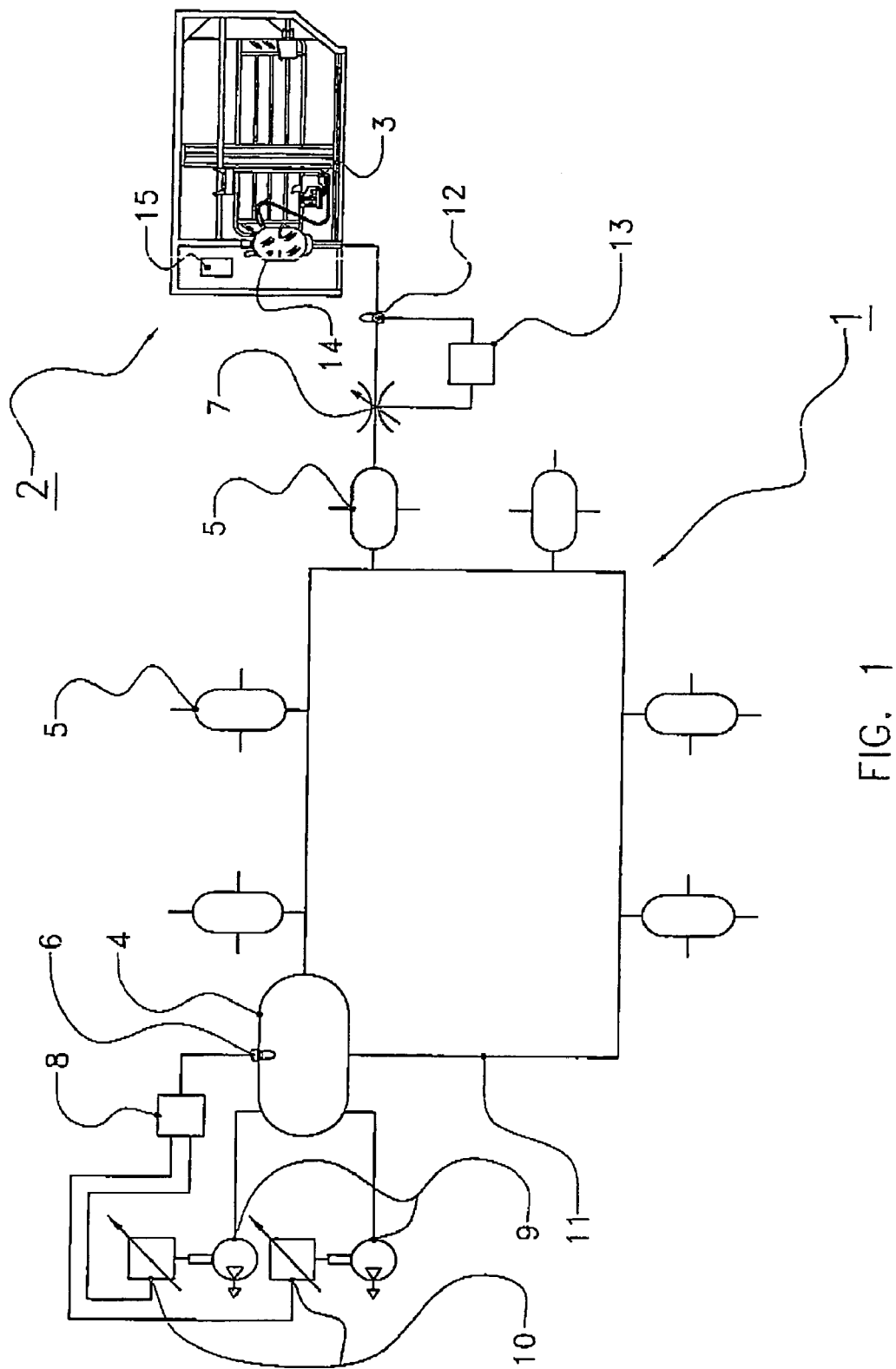
FIG. 1 shows schematically an embodiment of a device for milking animals according to the invention.

FIG. 1 shows schematically a device 1 for milking animals. The device 1 is provided with six milking stalls 2. The milking stalls may be of the type described in U.S. Pat. No. 6,213,051 the contents of which are hereby incorporated by reference in their entirety. Each milking stall 2 is provided with a milking robot 3 for inter alia automatically connecting at least one teat cup to a teat of an animal. Each milking robot 3 is further provided with a milking vacuum unit 14 for generating a milking vacuum for milking an animal. It is pointed out that it is also possible for one milking robot to serve several milking stalls. Each milking stall is also provided with its own computer 15.

According to the invention the device 1 is provided with a common ring line 11 that can be connected to the milking vacuum units 14 of relevant milking robots 3. Said connection of each milking vacuum unit 14 takes place in particular via a passage, and with the aid of control means, such as for example a controllable throttle valve 7, for controlling the size of the passage.

A controllable, central vacuum system (4, 6, 8, 9, 10) generates a vacuum with a first pressure on the common ring line 11. In the embodiment shown the vacuum system comprises two frequency-controlled vacuum pumps 9. It will be obvious however that any other number of pumps may also be applied within the scope of the invention. The frequency-controlled vacuum pumps 9 are controlled by a single master controller 8. The master controller 8 may work in a master-slave relationship with the individual computers 15 in the respective milking stalls 2. A common buffer vessel 4 prevents undesired pressure fluctuations in the ring line 11 and is arranged in particular between the vacuum pumps 9 and the ring line 11.

A pressure sensor 6 is disposed in the common buffer vessel 4, so that the pressure in the common buffer vessel 4 can be measured. The data from the pressure sensor 6 may be used for controlling the frequency-controlled vacuum pumps 9 in such a way that a desired pressure is generated and maintained in the common buffer vessel 4, and consequently in the ring line 11.

In order to prevent undesired pressure fluctuations in a milking vacuum unit 14, there is disposed an individual buffer vessel 5 between each controllable throttle valve 7 and the ring line 11. Each milking vacuum unit 14 is provided with a pressure sensor 12 for measuring the pressure in the milking vacuum unit 14, and for controlling, if necessary, the throttle valve 7 via a pressure regulator 13. The throttle valve 7 is in particular controlled by the pressure sensor 12 and to pressure regulator 13 in such a way that there is generated in the relevant milking vacuum unit 14 a vacuum with a pressure higher than the first pressure in the ring line 11. Said first pressure is preferably between −55 kPa and −50 kPa whereas the second pressure is preferably between −50 kPa and −40 kPa. In an alterative embodiment, the buffer vessel S may be located between the throttle valve 7 and the milking vacuum unit 14.

The vacuum pumps 9 may also be controlled with the aid of data in relation to how many milking robots are in a particular milking process stage. Here it may be taken into account for example how many milking robots are actually active, how many milking robots are connecting teat cups, etc. For this purpose the device may be provided with a milking process stage device known per se, such as a computer 15 that is customarily used with milking robots.

The device 1 may be provided with further control valves (not-shown) known per se and with valve position devices (not-shown) known per se for determining the position of the control valves. In relation to the milking vacuum units, the valve position device may be constituted by the computer 15 which can provide an indication of the state of the valve. The controllable, central vacuum system may then advantageously be controlled with the aid of data from the valve position devices e.g. depending upon which valves are open and the extent of their opening.

Many modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. A device for milking animals, the device comprising:
   at least two milking robots, each for automatically connecting a plurality of teat cups to the teats of an animal, each milking robot being provided with a milking vacuum unit for generating a milking vacuum for milking an animal;
   a common ring line; and
   a controllable, central vacuum system for generating a vacuum with a first pressure on the common ring line;
   wherein each milking robot is connected to the ring line via a passage, which connects the individual milking vacuum unit to the central vacuum system, a control element being provided in each passage for individually controlling the size of the passage to supply a vacuum to the respective milking robot with a second pressure higher than the first pressure and wherein an individual buffer vessel is disposed between each of the control elements and the common ring line.

2. The device as claimed in claim 1, wherein the central vacuum system comprises at least one frequency-controlled vacuum pump.

3. The device as claimed in claim 1, wherein the central vacuum system comprises a common buffer vessel.

4. The device as claimed in claim 3, wherein a pressure sensor is disposed in the common buffer vessel.

5. The device as claimed in claim 1, wherein each milking vacuum unit comprises a pressure sensor.

6. The device as claimed in claim 5, wherein each of the control elements can be controlled by the respective pressure sensor.

7. The device as claimed in claim 6, wherein the first pressure is between −55 kPa and −50 kPa, and the second pressure is between −50 kPa and −40 kPa.

8. The device as claimed in claim 1, wherein the device further comprises a milking process stage device for determining the stage of the milking process in a milking robot, and wherein the controllable, central vacuum system can be controlled with the aid of data from the milking process stage device.

9. The device as claimed in claim 1, wherein the control elements comprise control valves having valve position devices for determining a position of the control valves, and the controllable, central vacuum system can be controlled with the aid of data from the valve position devices.

10. A method of milking animals, the method comprising:
   automatically connecting at least a first teat cup to a teat of a first animal;
   automatically connecting at least a second teat cup to a teat of a second animal;
   generating in a central vacuum system a vacuum with a first pressure on a common ring line;
   supplying the vacuum from the common ring line through respective first and second vacuum units to each of the first and second teat cups at a second pressure higher than the first pressure; and
   individually controlling the vacuum supply from the common ring line to each of the first and second vacuum units wherein the vacuum is supplied from the common ring line to each of the first and second vacuum units through individual buffer vessels disposed between each of the vacuum unit and the common ring line.

11. The method as claimed in claim 10, wherein the vacuum is generated by at least one frequency-controlled vacuum pump.

12. The method as claimed in claim 10, wherein the vacuum is supplied to the common ring line through a common buffer vessel.

13. The method as claimed in claim 12, wherein a common pressure sensor is disposed in the common buffer vessel.

14. The method as claimed in claim 10, wherein each of the first and second teat cups is provided with a local pressure sensor.

15. The method as claimed in claim 14, wherein the vacuum supply from the common ring line to each of the first and second teat cups is controlled by control elements located between the common ring line and the respective teat cup.

16. The method as claimed in claim 15, wherein the control elements are controlled by the respective local pressure sensor.

17. The method as claimed in claim 16, wherein the first pressure is between −55 kPa and −50 kPa, and in that the second pressure is between −50 kPa and −40 kPa.

18. The method as claimed in claim 10, further comprising determining a stage of a milking process and controlling the central vacuum system on the basis of the milking process stage.

19. The method as claimed in claim 10, wherein the control elements comprise control valves having valve position devices for determining a position of the control valves, and the method further comprises controlling the central vacuum system with the aid of data from the valve position devices.

* * * * *